(12) United States Patent
Rubin et al.

(10) Patent No.: US 6,871,045 B2
(45) Date of Patent: Mar. 22, 2005

(54) IN-ORBIT RECONFIGURABLE COMMUNICATIONS SATELLITE

(76) Inventors: Philip A. Rubin, 3761 Oliver St., NW., Washington, DC (US) 20015; Jeffery B. Freedman, 11378 Bishops Gate La., Laurel, MD (US) 20723; Ted M. Kaplan, 11500 Evelake Ct., North Potomac, MD (US) 20878

( * ) Notice: Subject to any disclaimer, the term of this patent is extended or adjusted under 35 U.S.C. 154(b) by 603 days.

(21) Appl. No.: 09/907,507

(22) Filed: Jul. 18, 2001

(65) Prior Publication Data

US 2003/0017803 A1 Jan. 23, 2003

(51) Int. Cl.[7] .............................................. H04B 7/185
(52) U.S. Cl. ..................... 455/12.1; 455/13.3; 455/427; 455/430
(58) Field of Search .............................. 455/12.1, 13.3, 455/427, 430, 428, 429, 13.1, 278.1, 8; 342/354, 352

(56) References Cited

U.S. PATENT DOCUMENTS

| | | | |
|---|---|---|---|
| 4,144,495 A | | 3/1979 | Metzger |
| 4,232,266 A | * | 11/1980 | Acampora ................... 370/323 |
| 4,868,886 A | | 9/1989 | Assal et al. |
| 4,975,707 A | | 12/1990 | Smith |
| 5,227,802 A | | 7/1993 | Pullman et al. |
| 5,576,721 A | * | 11/1996 | Hwang et al. ............... 343/753 |
| 5,612,701 A | * | 3/1997 | Diekelman ................... 342/354 |
| 5,929,804 A | | 7/1999 | Jones et al. |
| 5,949,370 A | | 9/1999 | Smith et al. |
| 6,047,165 A | | 4/2000 | Wright et al. |
| 6,075,969 A | | 6/2000 | Lusignan |
| 6,269,242 B1 | * | 7/2001 | Leopold et al. ............. 455/427 |
| 6,556,809 B1 | * | 4/2003 | Gross et al. ................ 455/12.1 |
| 6,587,669 B2 | * | 7/2003 | Harmon et al. ............ 455/13.3 |
| 2002/0032003 A1 | * | 3/2002 | Avitzour et al. ........... 455/12.1 |
| 2002/0093451 A1 | * | 7/2002 | Harmon et al. ............. 342/354 |

* cited by examiner

Primary Examiner—Nick Corsaro
Assistant Examiner—Tan Trinh
(74) Attorney, Agent, or Firm—Miles & Stockbridge P.C; Edward J. Kondracki

(57) ABSTRACT

The footprint of a first satellite is reconfigurable in orbit by ground control to switch on and off different transponders. Each transponder is connected to a corresponding downlink antenna feed, each of which transmits a downlink beam independent of the others. The satellite can be moved into different orbits or otherwise changed to service new geographic areas by using different combinations of the transponders. In one embodiment, the satellite includes an antenna and components for an uplink beam corresponding to each downlink beam. Various subsets of the downlink antenna feeds are mechanically linked to move in unison using gimbals, each subset using a corresponding gimbal and mechanical driver. The first satellite is sufficiently reconfigurable that it may serve as a back up satellite to a plurality of other satellites in a constellation of satellites.

18 Claims, 4 Drawing Sheets

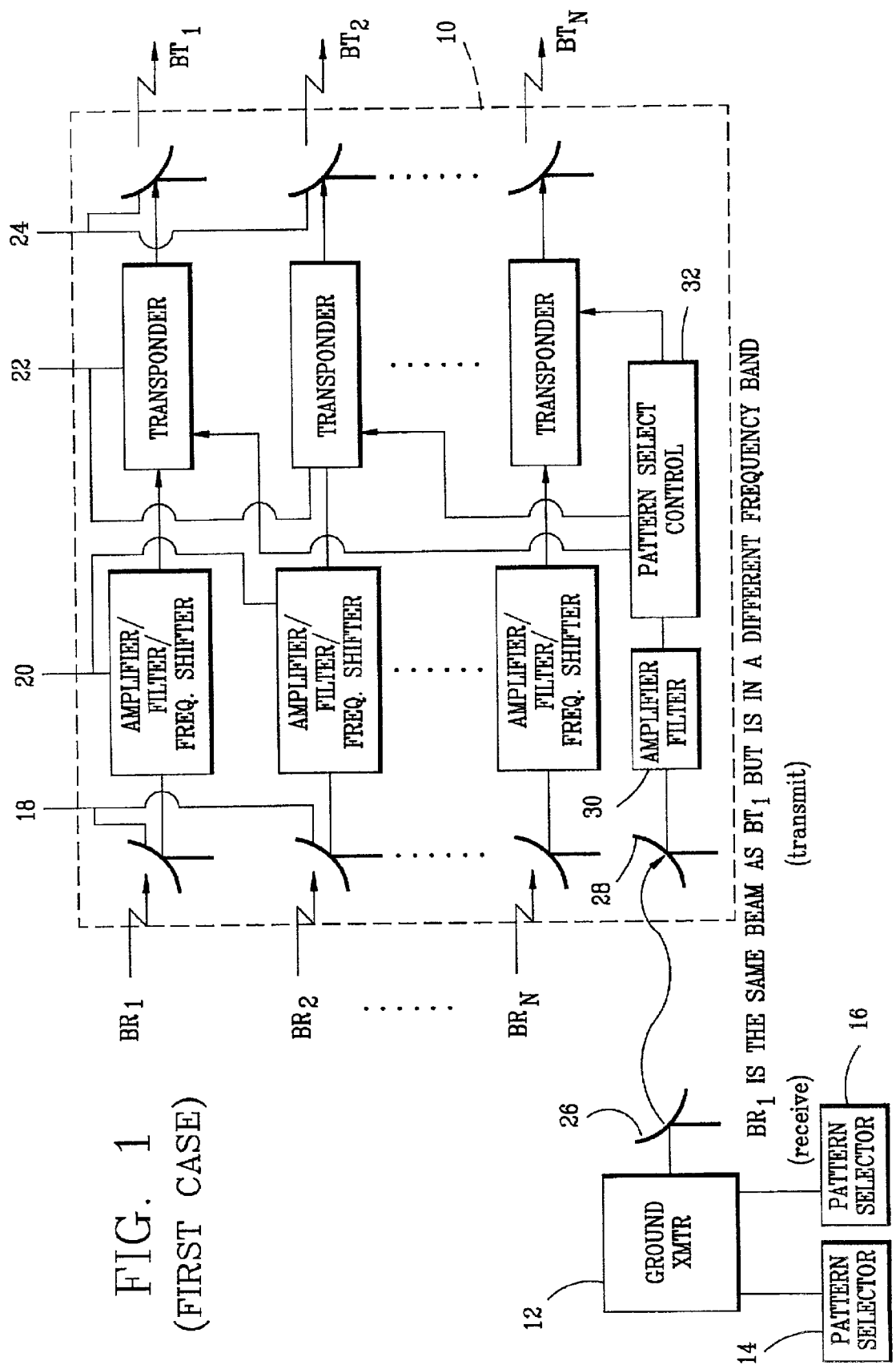

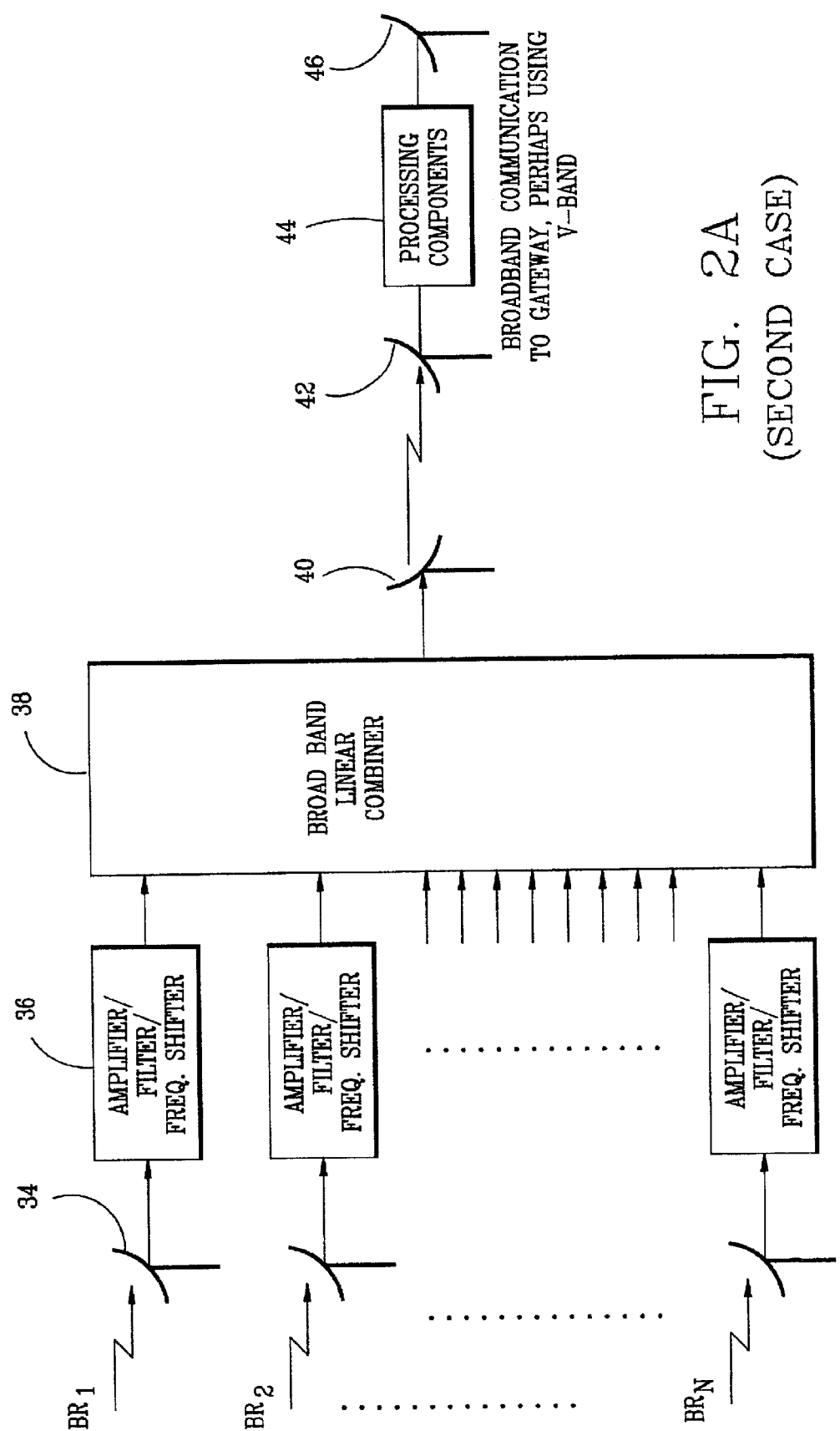
FIG. 2A (SECOND CASE)

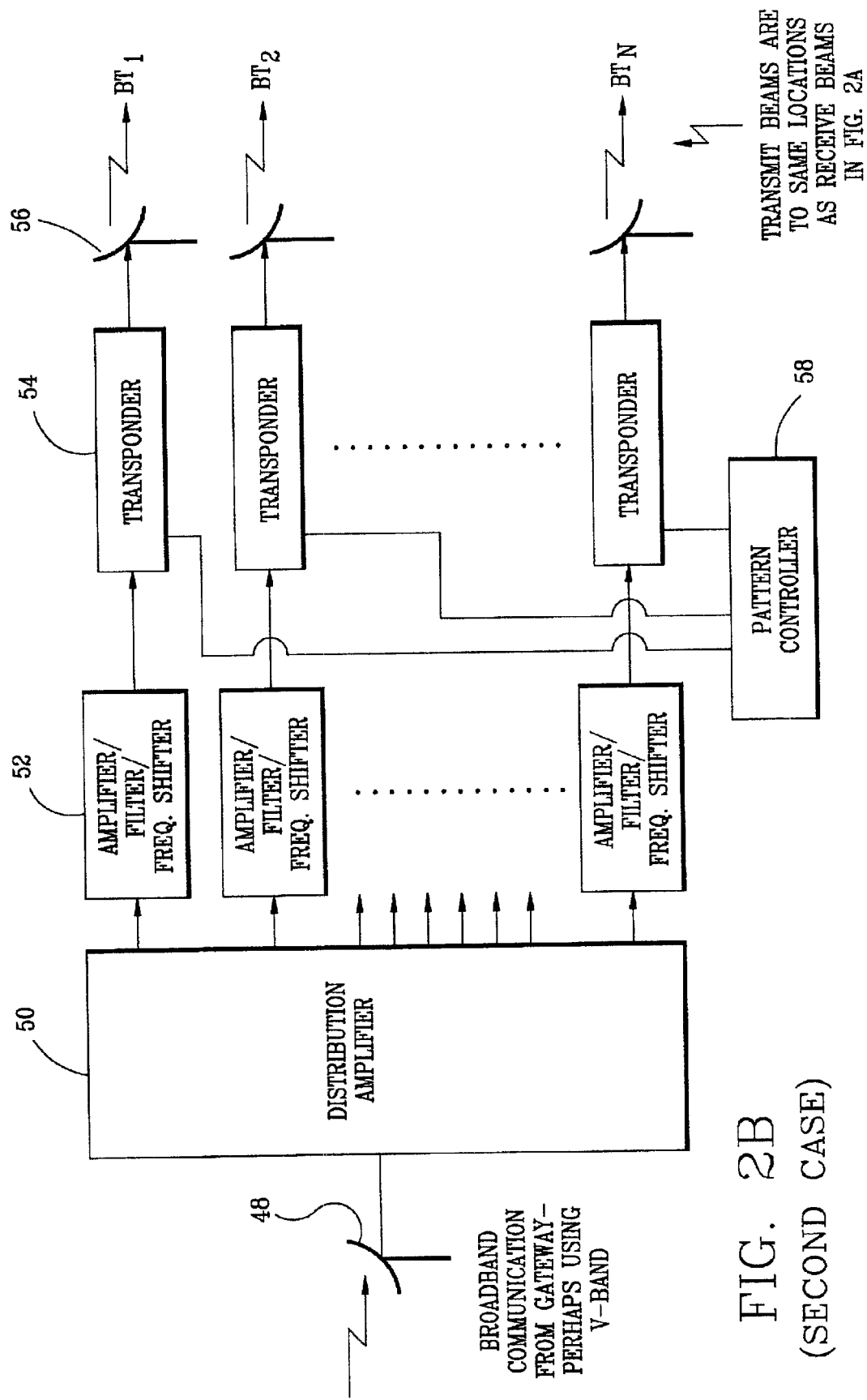
FIG. 2B (SECOND CASE)

IN-ORBIT RECONFIGURABLE COMMUNICATIONS SATELLITE

BACKGROUND OF THE INVENTION

The present invention relates to communication satellites. More specifically, it relates to satellites having communications footprints (i.e., spatial pattern of signals) that can be reconfigured when the satellite is in space.

When using a satellite to provide communications with or to a land mass or other limited geographic area, it is known to try to match the footprint of the signals with the area being served. That is, the satellite should concentrate its signal energy in the area being served.

The present invention relates to systems which use very high frequency bands (Ka-Band and above) where the preferable coverage of an area to be serviced consists of small independent beams, each using a portion of the available frequency band in a frequency reuse pattern. This reuse pattern requires subdivision of the available frequency band in a small number of bands, typically four to seven, where beams of different frequencies overlap slightly in a close knit pattern but adjacent re-use of the same pattern produces insignificant overlap of beams using the same sub-band. For the same size satellite antenna, higher frequencies produce smaller beams on the earth. This use of small beams, on the order of 0.5 to 0.9 degrees, can be implemented with a reflector using a large number of separate feeds, with each feed connected to one or more amplifiers (transponders). The feeds are not phased together in a network to form beams but are each independent, and each produces a single beam. Formation of small beams on the satellite is practical at the Ka-Band.

When the satellite is in space at a particular orbital slot, it may be desirable to move the satellite to a different orbital slot to replace a satellite that is malfunctioning or for contractual or other reasons. However, when the satellite is moved to a different orbital slot with a corresponding second geographic area different from the original service area, the satellite has a footprint matching the boundaries of the original geographic area being serviced, not the new or second geographic area. Depending on the differences in shape(s) and size(s) of the first and second geographic areas, the signal footprint of the satellite may make it impractical to move the satellite to service an area different from the first area.

This problem of matching the satellite to its intended footprint hindering its flexibility in use (i.e., making it unfeasible or at least less effective in use upon changing the service area once the satellite is in space) is especially significant when dealing with small beams.

Various U.S. patents relating to communications techniques will be discussed.

Metzger U.S. Pat. No. 4,144,495 shows a satellite with a reconfigurable beam switching system.

Assal U.S. Pat. No. 4,868,886 shows a reconfigurable beam satellite including a series of switches to select elements in an antenna array to produce a spot beam pattern.

Smith U.S. Pat. No. 5,949,370 shows a reconfigurable beam satellite where a reflector antenna is moved relative to elements in the feed array.

Jones U.S. Pat. No. 5,929,804 shows a phase shift arrangement where a beam is directed by a phased array.

Although many of the prior designs have been generally useful, they have often been subject to one or more of several disadvantages.

Those techniques that rely on phased array arrangements are usually quite complex.

Many techniques use a plurality of feed elements to produce an overall pattern at a given frequency. However, the pattern uses all the elements as part of an array as opposed to independent beams. Therefore, the bandwidth may be limited compared with arrangements using independent beams on different frequencies where each frequency is used repeatedly with geographic spacing between the beams using the same frequency.

Various communications satellites are relatively inflexible in use. If optimized for use at a particular orbital position and/or for a particular service area (geographic area in which service is provided), they often are not able to effectively adjust to a new orbital position and/or new service area.

OBJECTS AND SUMMARY OF THE INVENTION

Accordingly, it is a primary object of the present invention to provide a new and improved technique for reconfiguring a satellite footprint after it is in orbit.

A more specific object of the present invention is to provide satellite in orbit reconfiguration in a relatively simple manner.

The above and other features of the present invention which will be more readily understood when the following detailed description is considered in conjunction with the accompanying drawings are realized by a method of matching a communications satellite footprint to an area to be served, the steps comprising: providing a first satellite with a plurality of transponders and a plurality of downlink antenna feeds, each transponder connected to a corresponding downlink antenna feed to provide a downlink beam independent of other downlink beams; and providing a pattern controller within the satellite to select, based on signals from a ground station, a transmission footprint corresponding to a pattern for the downlinks by selectively turning on and off transponders. The method further includes turning on a first set of less than all of the transponders to provide a first transmission footprint corresponding to a first geographic area to be served. A pattern control signal is sent from a ground station. The pattern control signal is received in the satellite. The pattern controller is used to change, based on the pattern control signal, to a second transmission footprint corresponding to a second geographic area to be served, the change to the second transmission footprint accomplished by selectively turning on and off transponders such that a second set of less than all of the transponders remains on, the second set being different than the first set.

The method preferably further comprises the step of moving the first satellite to a new orbital position, the second transmission footprint being used in the new orbital position, whereas the first transmission footprint having been used in an old orbital position of the first satellite.

Before changing to the second transmission footprint, the method includes moving the first satellite to a new orbital position.

A plurality of reception routes are provided on the first satellite, each reception route with a corresponding uplink antenna feed and a corresponding electronic component; and wherein each reception route being used at a given time corresponds to one of the transponders at the given time.

The method includes the steps of mechanically linking a first plurality of the antenna downlink feeds for movement in unison relative to the first satellite, mechanically linking a second plurality of the antenna downlink feeds for movement in unison relative to the first satellite, and changing the transmission footprint by moving the first plurality of the antenna downlink feeds in unison and moving the second plurality of the antenna downlink feeds in unison.

An output of each reception route is provided as an input to the corresponding transponder.

The first satellite is a back up satellite that is operable to replace any one of a plurality of other satellites upon malfunctioning or damage to the one of the plurality of other satellites.

The communicating step includes communicating an output of each reception route to the corresponding transponder via the gateway.

The method further comprises the steps of mechanically linking a third plurality of the antenna downlink feeds for movement in unison relative to the first satellite, and wherein the step of changing the transmission footprint by moving the first and second pluralities also includes moving the third plurality of the antenna downlink feeds in unison. The method further comprises the steps of mechanically linking a fourth plurality of the antenna downlink feeds for movement in unison relative to the first satellite, and wherein the step of changing the transmission footprint by moving the first, second, and third pluralities also includes moving the fourth plurality of the antenna downlink feeds in unison.

The present invention may alternately be described as a communications satellite with a plurality of transponders and a plurality of downlink antenna feeds, each transponder connected to a corresponding downlink antenna feed to provide a downlink beam independent of other downlink beams. A pattern controller is within the satellite to select, based on signals from a ground station, a transmission footprint corresponding to a pattern for the downlinks by selectively turning on and off transponders. A receiver is within the satellite for receiving a pattern control signal from a ground station in the satellite. The pattern controller is operable to change, based on the pattern control signal, a transmission footprint corresponding to a geographic area to be served by selectively turning on and off transponders such that a set of less than all of the transponders remains on.

Preferably, the pattern controller is operable to adjust the transmission footprint depending on any changes in an orbital slot of the satellite.

The communications satellite has a plurality of reception routes on the satellite, each reception route with a corresponding uplink antenna feed and a corresponding processing component; and wherein each reception route being used at a given time corresponds to one of the transponders at the given time. An output of each reception route is supplied as an input to the corresponding transponder. The output of each reception route is directly provided to the corresponding transponder.

The communications satellite further includes a first mechanical driver connected to a first plurality of the antenna downlink feeds for movement in unison relative to the satellite, a second mechanical driver connected to a second plurality of the antenna downlink feeds for movement in unison relative to the satellite and wherein the first and second mechanical drivers are operative to change the transmission footprint by moving the first plurality of the antenna downlink feeds in unison and moving the second plurality of the antenna downlink feeds in unison. A third mechanical driver is connected to a third plurality of the antenna downlink feeds for movement in unison relative to the satellite, and wherein the third mechanical driver is operative to change the transmission footprint by moving the third plurality of the antenna downlink feeds in unison. A fourth mechanical driver is connected to a fourth plurality of the antenna downlink feeds for movement in unison relative to the satellite, and wherein the fourth mechanical driver is operative to change the transmission footprint by moving the fourth plurality of the antenna downlink feeds in unison.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 1 is a simplified illustration of the present invention showing a satellite and ground station;

FIGS. 2A and 2B show two satellites in an alternate technique of the present invention;

DETAILED DESCRIPTION

Figure 5:
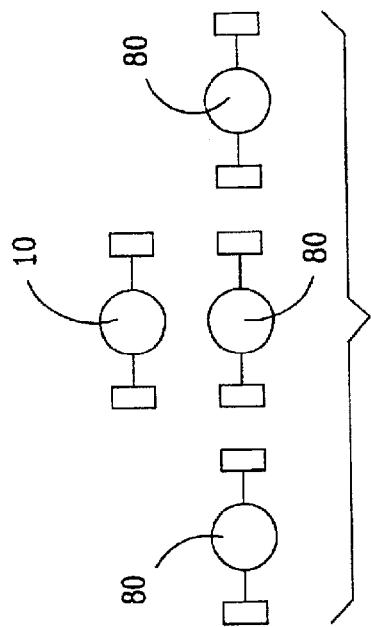
FIG. 5 is a simplified showing of various satellites illustrating that the present invention allows one satellite to back up (i.e., replace in event of malfunction) any one of a constellation of other satellites with different geographic coverage areas.

FIG. 1 shows a satellite configuration using the present invention. The satellite 10 is controlled by a ground station with transmitter 12 connected to a pattern selector 14 which controls the footprint of the satellite and position selector 16 which controls the position of the satellite.

By building the spacecraft antenna with a large number of feeds, more than necessary to cover most service areas, the satellite 10 may be moved to any orbital slot where geographic areas such as land masses are to be covered, and only the groups of beams covering the desired service areas are energized. This is facilitated by the same worldwide allocations of the Ka-Band and higher bands. Ku-Band for example does not have the same allocations worldwide. Thus, if it is desirable to have a satellite in a different orbital location from where one presently exists, the satellite may be moved elsewhere and the lay-down of the beams can be adjusted to again cover the desired service area. This would entail energizing some beams not used in the previous location and de-energizing other beams not needed in the new location.

Each beam consists of an up-link portion in one frequency band and a downlink portion in a second independent frequency band. The satellite 10 is built in the "bent pipe" mode such that the content of an up-link beam is frequency-converted and sent back down the companion downlink beam. In this way traffic within a particular city, or each geographic area within a beam pair is served.

The uplink portion includes an uplink antenna 18 and electronic components 20 (such as a switch, amplifier, filter and frequency shifter). The output of each component 20 is supplied directly to a corresponding transponder 22 which feeds a corresponding downlink antenna feed 24. There are N sets of the components 18 to 22, each set in parallel to the other sets.

A pattern control signal determined by pattern selector 14 is transmitted by transmitter 12 via antenna 26 to satellite antenna 28. The signal received is processed via filter/amplifier 30 and supplied to pattern controller 32. Pattern controller 32 turns on and off various of the transponders 22 such that the transmission footprint corresponds to the desired footprint from the position selected for the satellite by position selector 16. Alternatively, the pattern controller can switch capacity between beams. In other words, the uplink from any given area can be switched to different ones of the various downlink antennas.

Another satellite implementation provides service between a gateway and many customers. The satellite has the same pairing of up-link and downlink beams as before but the up-link beam is no longer connected directly to the downlink beam. Rather, the up-link beam in the satellite is connected to a downlink beam, which is received by the gateway. The gateway in turn has a companion up-link beam, which is connected to the companion downlink beam of customer up-link beam. In this way a bi-directional link is available to a customer outside of his geographical region by means of the gateway.

Turning now to FIG. 2A, a parallel arrangement of uplink antenna feeds 34 connect to processing components 36 (amplifier, filter, frequency shifter) supply a broadband linear combiner 38 which in turn feeds downlink antenna feed 40.

The signal from antenna 40 goes to a ground gateway having antenna feed 42, processing components 44 (receivers, signal processing, transmitters, etc.), and antenna feed 46.

Turning now to FIG. 2B, the signal from feed 46 of FIG. 2A goes to a satellite having antenna element 48. Element 48 in turn supplies the signals to distribution amplifier 50 which processes the signals and directs them to the appropriate downlink portion. Each of the parallel downlink portions has a electronic processing component 52 (switch, amplifier, filter, frequency shifter), transponder 54, and downlink antenna feed 56.

The transmission footprint of the satellite is controlled by a pattern controller 58 which is operable like pattern controller 32 of FIG. 1. For ease of illustration, the feed and processing components associated with supplying pattern controller 58 are not shown in FIG. 2B.

There are multiple implementations of the system that includes a gateway. First, the gateway would use the same frequency bands as the customer frequency bands. In this case the gateway and the customers must share the bands such that the customer capacity would be smaller than without a gateway.

A second implementation of a system with a gateway would use gateway links, which are not in the customer link bands. Such a system might employ the much higher V-Band for gateway links. Although this band is even more adversely effected by rain attenuation the gateway could be strategically located in an arid region where rain outages are remote. Since the bandwidth available at V-Band is much greater than at Ka-Band a great many customer links could be multiplexed prior to transmission from and to the satellite. A mechanical steering mechanism on board the spacecraft would point its beams toward the location of the gateway on the earth.

Figure 3:
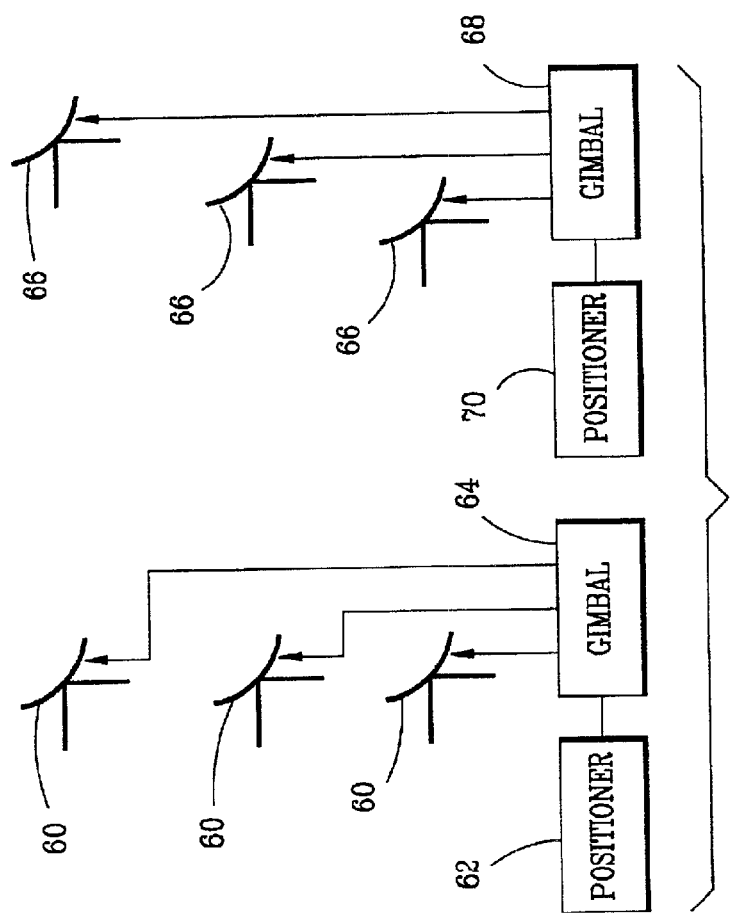
FIG. 3 is simplified illustration of a gimbal pattern control technique.

FIG. 3 shows a further technique, beyond the selective turning on and off of the transponders, to control the transmission footprint. This technique, which preferably would be used with the techniques of FIG. 1 or FIGS. 2A and 2B, has downlink feeds 60 positionable (i.e., relative to the satellite) in unison by a positioner 62 acting through gimbal 64. A second set of downlink feeds 66 are positionable by operation of gimbal 68 and positioner 70. A third and fourth set of downlink feeds positionable by a corresponding gimbal and positioner are not shown for ease of illustration. It should be understood that the downlink feeds 60 and 66 would be different subsets of the downlink feeds 24 of FIG. 1 or feeds 56 of FIG. 2B. Although not shown, each positioner is controller from the ground by a signal received from the ground and supplied to the positioner.

Figure 4:
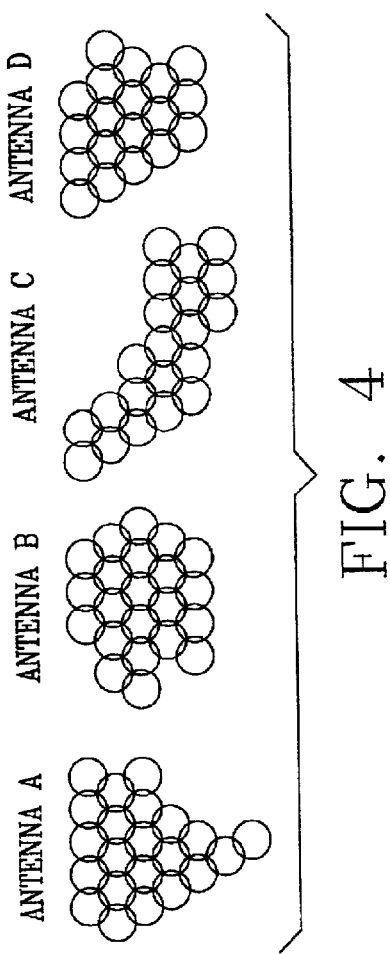
FIG. 4 is an illustration of four different antenna patterns, each pattern of which may be combined with others and each pattern having a plurality of beams and controlled by a corresponding gimbal.

Turning now to FIG. 4, the four subsets of downlink feeds controlled by the four positioners may supply corresponding transmission patterns A, B, C, and D. By combining them in various arrangements and by turning off some of the beams (i.e., shown as circles in the patterns) as discussed above, the footprint can be readily adjusted to match a desired service area. The transmission pattern can either be continuous as shown in FIG. 4 or discontinuous (i.e., there could be a discontinuity between adjacent beams such as the circles). If the beams from the antennas are discontinuous, one could have beams from antenna A for example interleaved with beams from antenna B such that the gaps in coverage of the antenna A beam are filled in by the coverage of antenna B and gaps in coverage of the antenna B beam are filled in by the coverage of antenna A. The possible downlink beams are a super set of all geographic regions to be served. That is, all possible downlink beams form a set larger than the set of beams shown in FIG. 4. However, by switching using the pattern select control and/or otherwise turning transponders on and off, the beam set at a given time is smaller than the superset of all possible beams.

Turning now to FIG. 5, the flexibility in configuring satellite 10 in space allows it to serve as a back up satellite for a plurality of other satellites 80 in a satellite constellation. Maximum flexibility would be provided by having each of the satellites 80 constructed like satellite 10. However, the satellites 80 could alternately be designed to only serve limited, different geographic regions, with only satellite 10 being reconfigurable and having the flexibility to replace any damaged or malfunctioning satellite 80.

Although specific constructions have been presented, it is to be understood that these are for illustrative purposes only. Various modifications and adaptations will be apparent to those of skill in the art. Therefore, the scope of the present invention should be determined by reference to the claims.

What is claimed is:

1. A method of matching a communications satellite footprint to an area to be served, the steps comprising:
   providing a first satellite with a plurality of transponders and a plurality of downlink antenna feeds, each transponder connected to a corresponding downlink antenna feed to provide a downlink beam independent of other downlink beams;
   providing a pattern controller within the satellite to select, based on signals from a ground station, a transmission footprint corresponding to a pattern for the downlinks by selectively turning on and off transponders;
   turning on a first set of less than all of the transponders to provide a first transmission footprint corresponding to a first geographic area to be served;
   sending a pattern control signal from a ground station;
   receiving the pattern control signal in the satellite; and
   using the pattern controller to change, based on the pattern control signal, to a second transmission footprint corresponding to a second geographic area to be served, the change to the second transmission footprint accomplished by selectively turning on and off transponders such that a second set of less than all of the transponders remains on, the second set being different than the first set.

2. The method of claim 1 further comprising the step of moving the first satellite to a new orbital position, the second transmission footprint being used in the new orbital position, whereas the first transmission footprint having been used in an old orbital position of the first satellite.

3. The method of claim 1 further comprising the step of; before changing to the second transmission footprint, moving the first satellite to a new orbital position.

4. The method of claim 1 further comprising the step of: providing a plurality of reception routes on the first a satellite, each reception route with a corresponding uplink antenna feed and a corresponding electronic processing component; and wherein each reception route being used at a given time corresponds to one of the transponders at the given time.

5. The method of claim 4 wherein the plurality of reception routes is provided on the first satellite.

6. The method of claim 5 further comprising the step of: providing an output of each reception route as an input to the corresponding transponder.

7. The method of claim 6 wherein the output of each reception route is directly provided to the corresponding transponder.

8. The method of claim 4 wherein the first satellite is a back up satellite that is operable to replace any one of a plurality of other satellites upon malfunctioning or damage to the one of the plurality of other satellites.

9. The method of claim 8 wherein the communicating step includes communicating an output of each reception route to the corresponding transponder via the gateway.

10. The method of claim 1 further comprising the steps of mechanically linking a first plurality of the antenna downlink feeds for movement in unison relative to the first satellite, mechanically linking a second plurality of the antenna downlink feeds for movement in unison relative to the first satellite, and changing the transmission footprint by moving the first plurality of the antenna downlink feeds in unison and moving the second plurality of the antenna downlink feeds in unison.

11. The method of claim 10 further comprising the steps of mechanically linking a third plurality of the antenna downlink feeds for movement in unison relative to the first satellite, and wherein the step of changing the transmission footprint by moving the first and second pluralities also includes moving the third plurality of the antenna downlink feeds in unison.

12. The method of claim 11 further comprising the steps of mechanically linking a fourth plurality of the antenna downlink feeds for movement in unison relative to the first satellite, and wherein the step of changing the transmission footprint by moving the first, second, and third pluralities also includes moving the fourth plurality of the antenna downlink feeds in unison.

13. A communications satellite comprising:
a plurality of transponders and a plurality of downlink antenna feeds, each transponder connected to a corresponding downlink antenna feed to provide a downlink beam independent of other downlink beams;
a pattern controller within the satellite to select, based on signals from a ground station, a transmission footprint corresponding to a pattern for the downlinks by selectively turning on and off transponders;
a receiver for receiving a pattern control signal from a ground station in the satellite;
a plurality of reception routes on the satellite, each reception route with a corresponding uplink antenna feed and a corresponding processing component; and wherein each reception route being used at a given time corresponds to one of the transponders at the given time;
wherein the pattern controller is operable to change, based on the pattern control signal, a transmission footprint corresponding to a geographic area to be served by selectively turning on and off transponders such that a set of less than all of the transponders remains on; and
wherein the pattern controller is operable to adjust the transmission footprint depending on any changes in an orbital slot of the satellite.

14. The communications satellite of claim 13 wherein an output of each reception route is supplied as an input to the corresponding transponder.

15. The communications satellite of claim 14 wherein the output of each reception route is directly provided to the corresponding transponder.

16. A communications satellite comprising:
a plurality of transponders and a plurality of downlink antenna feeds, each transponder connected to a corresponding downlink antenna feed to provide a downlink beam independent of other downlink beams;
a pattern controller within the satellite to select, based on signals from a ground station, a transmission footprint corresponding to a pattern for the downlinks by selectively turning on and off transponders;
a receiver for receiving a pattern control signal from a ground station in the satellite;
a first mechanical driver connected to a first plurality of the antenna downlink feeds for movement in unison relative to the satellite, a second mechanical driver connected to a second plurality of the antenna downlink feeds for movement in unison relative to the satellite and wherein the first and second mechanical drivers are operative to change the transmission footprint by moving the first plurality of the antenna downlink feeds in unison and moving the second plurality of the antenna downlink feeds in unison; and
wherein the pattern controller is operable to chance, based on the pattern control signal, a transmission footprint corresponding to a geographic area to be served by selectively turning on and off transponders such that a set of less than all of the transponders remains on.

17. The communications satellite of claim 16 further comprising a third mechanical driver connected to a third plurality of the antenna downlink feeds for movement in unison relative to the satellite, and wherein the third mechanical driver is operative to change the transmission footprint by moving the third plurality of the antenna downlink feeds in unison.

18. The communications satellite of claim 17 further comprising a fourth mechanical driver connected to a fourth plurality of the antenna downlink feeds for movement in unison relative to the satellite, and wherein the fourth mechanical driver is operative to change the transmission footprint by moving the fourth plurality of the antenna downlink feeds in unison.

* * * * *

UNITED STATES PATENT AND TRADEMARK OFFICE
CERTIFICATE OF CORRECTION

PATENT NO.    : 6,871,045 B2
DATED         : March 22, 2005
INVENTOR(S)   : Philip A. Rubin et al.

It is certified that error appears in the above-identified patent and that said Letters Patent is hereby corrected as shown below:

Column 8,
Line 47, please delete "chance" and replace with -- change --.

Signed and Sealed this

Ninth Day of August, 2005

JON W. DUDAS
*Director of the United States Patent and Trademark Office*